US007254818B2

(12) United States Patent
Hagstrom

(10) Patent No.: US 7,254,818 B2
(45) Date of Patent: Aug. 7, 2007

(54) SELF ALIGNING DISC TRAY DRIVE

(75) Inventor: Erick Hagstrom, Medina, MN (US)

(73) Assignee: Primera Technology, Inc., Plymouth, MN (US)

( * ) Notice: Subject to any disclaimer, the term of this patent is extended or adjusted under 35 U.S.C. 154(b) by 519 days.

(21) Appl. No.: 10/760,971

(22) Filed: Jan. 20, 2004

(65) Prior Publication Data

US 2005/0160435 A1    Jul. 21, 2005

(51) Int. Cl.
*G11B 17/03* (2006.01)

(52) U.S. Cl. ..................................... 720/601
(58) Field of Classification Search .............. 720/607, 720/608, 613, 614, 615, 622, 632, 633, 601
See application file for complete search history.

(56) References Cited

U.S. PATENT DOCUMENTS

| 5,020,926 | A |   | 6/1991 | Wilhelm ...................... 400/54 |
| 5,299,185 | A | * | 3/1994 | Sakurai et al. ............... 720/628 |
| 5,542,768 | A |   | 8/1996 | Rother et al. .......... 400/120.16 |
| 5,548,567 | A | * | 8/1996 | Sawai ...................... 369/30.39 |
| 5,612,727 | A |   | 3/1997 | Morimoto et al. .......... 347/198 |
| 5,927,208 | A |   | 7/1999 | Hagstrom et al. .......... 101/486 |
| 6,148,722 | A |   | 11/2000 | Hagstrom ..................... 101/35 |
| 6,452,893 | B1 | * | 9/2002 | Wahl ..................... 369/178.01 |
| 6,760,052 | B2 |   | 7/2004 | Cummins et al. ........... 347/171 |
| 6,802,070 | B2 | * | 10/2004 | Britz et al. ................. 720/619 |
| 6,983,469 | B2 | * | 1/2006 | Steinhilber .................. 720/600 |
| 6,990,674 | B1 | * | 1/2006 | Cummins et al. ........... 720/623 |
| 2003/0095478 | A1 | * | 5/2003 | Russ ....................... 369/30.34 |
| 2003/0222928 | A1 |   | 12/2003 | Cummins et al. .............. 347/2 |
| 2006/0179445 | A1 | * | 8/2006 | Russ ......................... 720/619 |

FOREIGN PATENT DOCUMENTS

DE    197 50 570 A1    11/1997

* cited by examiner

*Primary Examiner*—Allen Cao
(74) *Attorney, Agent, or Firm*—Westman, Champlin & Kelly, P.A.

(57) ABSTRACT

A tray is mounted in a framework for sliding between extended and retracted positions, and has a separate drive adjacent each of the opposite sides of the tray. The drives on the opposite sides of the tray are effected through friction clutches so that one of the drives can be stationary and slipping while the other drive continues to move the tray. Reference stops are provided to orient the tray against the stops each time the tray is retracted.

16 Claims, 5 Drawing Sheets

SELF ALIGNING DISC TRAY DRIVE

BACKGROUND OF THE INVENTION

The present invention relates to a tray drive for use in a compact disc processor such as a printer, duplicator, or the like. The device will self align the tray when the tray is fully retracted into the processing station to ensure that the tray is not skewed or misapplied to cause errors in the processing function. The drive is symmetrical so the tray remains properly positioned as it is extended to a loading position. The tray drive will realign the tray as it is retracted to a reference stopped position with each retraction of the tray.

In the prior art, it is well known to utilize this compact disc processing device for printing labels on the disc as well as recording discs. Processing devices that include both CD recorders and label printers in one processing unit have been advanced, as shown in U.S. patent application Ser. No. 10/447,503, filed May 29, 2003, which is incorporated by reference. It is well known to mechanically drive the disc holding trays between a processing position, wherein the tray is supported to hold the disc in position for printing or recording on the disc, and an extended position or loading position wherein the tray is outside of the processing station and the disc can be removed from the tray, and a new disc replaced.

In the above application Ser. No. 10/447,503, the discs are handled mechanically with a robotics arm, and are moved between an input bin for unprocessed discs, and the tray used for processing, and between the tray and a finished disc storage. The automated processing makes it important that the disc is at a known position in both the extended, loading position of the tray and the retracted or processing position of the tray.

SUMMARY OF THE INVENTION

The present invention relates to a drive for a tray used in a compact disc processor that will drive the tray with a symmetrical drive and bring the tray to a reference position as the tray is retracted. The seating of the tray in a reference position is done automatically each time the tray is extended and then retracted.

The tray drive comprises belts, one on each side of the tray, driven by positive drive rollers or sprockets, and connected to the tray through a link. In the present invention a single drive shaft is used for driving belt drive pulleys or sprockets on both sides of the tray, so that the drive is symmetrical or balanced on the tray and there is no tendency to exert a drive effort that would tend to skew the tray from its guided path. As the tray extends, the guides that are used for the tray become less effective, because the guides are of a shorter length than when the tray is fully retracted. The two drive belts will provide an equal force on the tray as it is extended, lessening the chance for skewing.

Additionally, the drive from the shaft to the belt pulleys or sprockets is through friction clutches so that one of the belts can remain stationary while the other belt will drive as the tray is retracted. The tray includes reference stop bumpers along opposite sides of the tray that will engage stop members at a known location as the tray retracts. The stop bumpers are on the opposite sides of the tray so that if one stop bumper engages its reference stop before the other, the drive belt on the side that has not engaged the stop position will continue to be effective to drive the belt on that side of the tray until that stop bumper also engages its reference stop.

In this manner, each time the tray is retracted, the tray will be centered or referenced to the center line of the guide supporting the tray and the tray will not be skewed, but will be held properly positioned for processing.

DETAILED DESCRIPTION OF THE PREFERRED EMBODIMENTS

Figure 1:
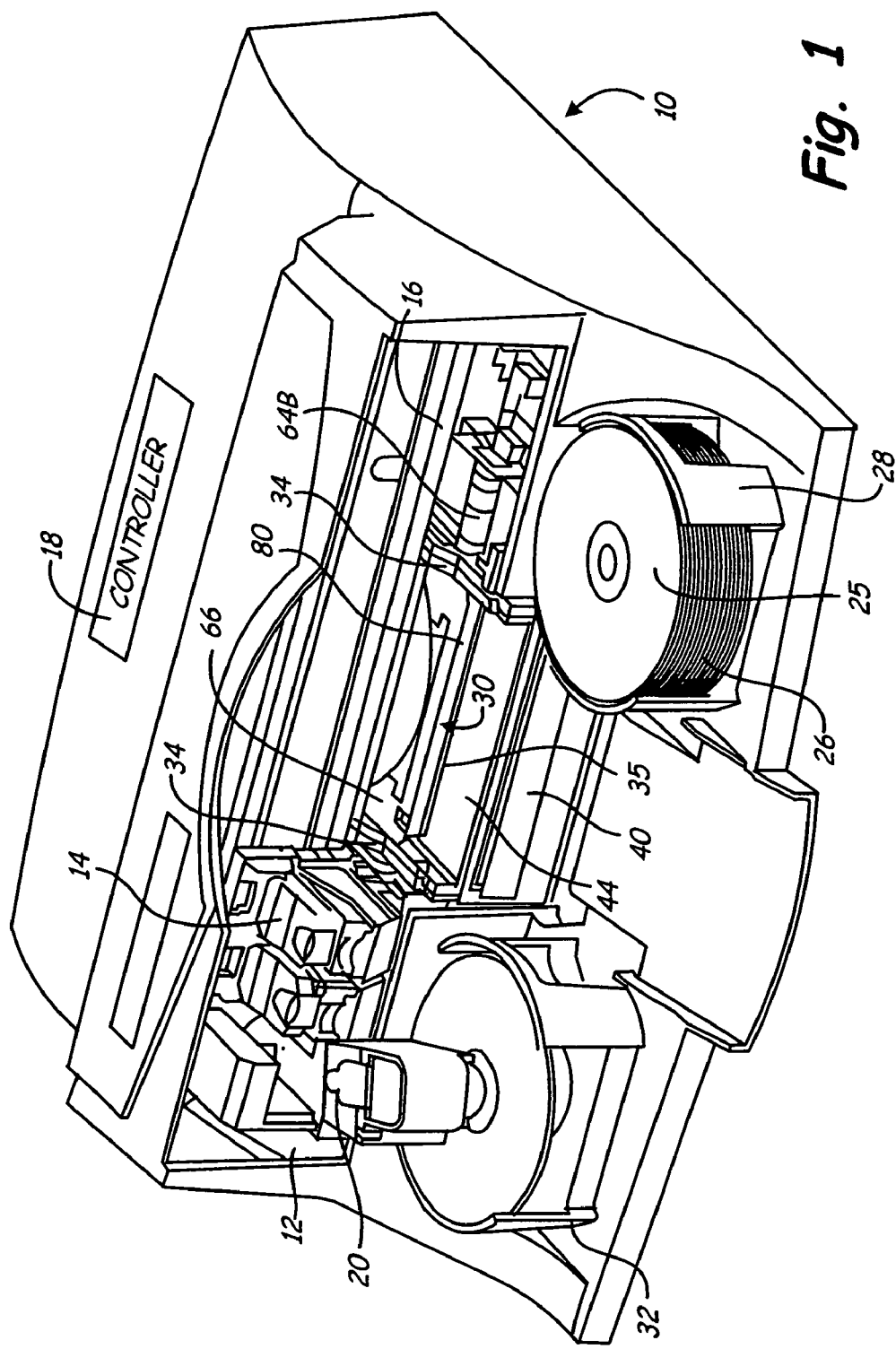
FIG. 1 is a schematic view of a processor that processes compact discs and employs the disc support tray drive of the present invention.
Figure 2:
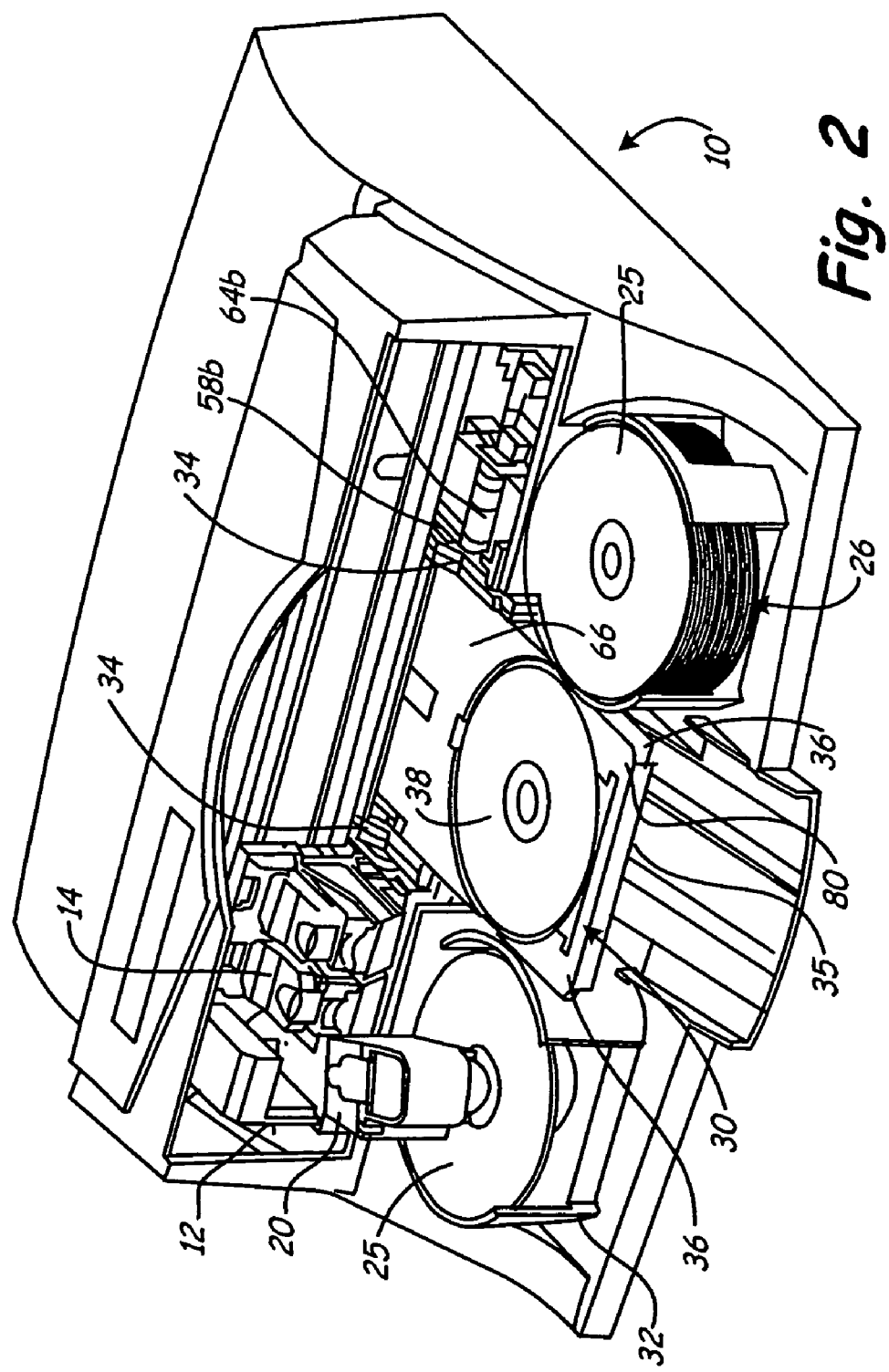
FIG. 2 is a processor of FIG. 1 with a compact disc support tray assembly extended to a loading position.

In FIGS. 1 and 2, a compact disc processor is illustrated at 10. The processor that is shown is illustrative of the type of device that includes at least one processing station and with a compact disc support tray that is extendible and retractable. The tray will move from a retracted processing position, to an extended position wherein it can be accessed for loading and unloading discs. Processor 10, comprises a recorder and printer combination, and this is shown in more detail in U.S. patent application Ser. No. 10/447,503, filed May 29, 2003, which is incorporated by reference.

It is to be understood that the present invention that relates to tray alignment can be used with any type of processor, and the showing of FIG. 10 is for illustration.

The processor includes a frame 12 that supports a pair of print heads 14, that are movable transversely along a guide shaft 16 under control from the processor controller 18 that is internal and programmed to control the processors and the trays. Controller 18 is used for operating the various functions, including a robotics arm 20 that is moved with the print heads 14, so that it can pick up a disc shown at 25 from a stack 26 in an input bin 28, over to a center location, as shown in FIG. 2, a disc support assembly illustrated generally at 30 that can be, in this instance, a tray for a printer. The tray assembly 30 is shown in its retracted position at FIG. 1, and is extended out in its loading position at FIG. 2.

The processor also includes a finished disc storage bin 32, on the opposite side of the loading station where the tray assembly 30 is illustrated.

It can be seen that the tray assembly 30 has a bottom plate 35 that has edge portions 36, 36 that form guides which fit into fixed rails 34, 34 on opposite sides of the tray assembly. The tray assembly is slidably supported on the rails 34, 34. The rails 34, 34 are fixed in the processor station, to support and guide the tray.

The controller 18 is used operating motors for extending and retracting the tray, and moving the robotic arm 20 to pick a disc 25 from the input bin 28, and move it to the tray assembly 30 and drop it into a disc locating recess 38 on the tray assembly for processing. Once the disc is loaded, the tray assembly is retracted into the correct position for processing, as shown, for printing. A tray 40 that is illustrated in FIG. 1 forms the same type of tray for use in a disc recorder or duplicator.

Figure 3:
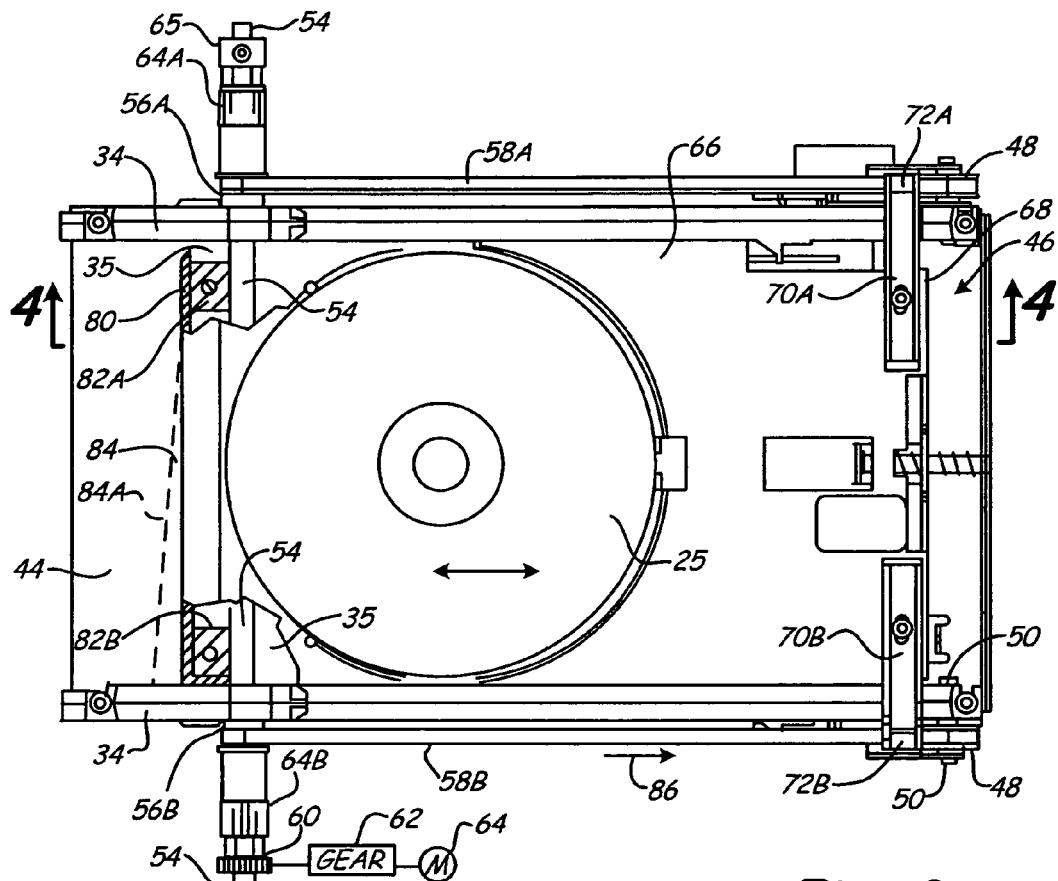
FIG. 3 is a top plan view of the tray assembly removed from the processing station, and in a retracted position.
Figure 4:
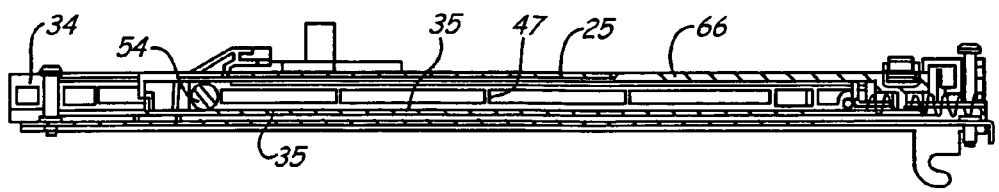
FIG. 4 is a sectional view taken as in line 4-4 in FIG. 3.

Referring to FIGS. 3 and 4, where the tray assembly 30 is removed from the processor for clarity, it can be seen that the fixed rails 34 are shown and the tray assembly is in its retracted portion in the processor. A rail support plate 44 is shown. This is also shown in FIG. 1, for orientation purposes.

Rails 34 and support plate 44 form a tray support frame 46 with side members shown in FIG. 4 at 47 that are used for supporting idler pulleys 48 at the inner end of the frame 46. These pulleys 48 are rotatable on suitable shafts 50. At the forward end of the frame 46, side members 47 are used for supporting a drive shaft 54, which extends all the way across the frame 46 and protrudes outwardly from the rails 34. The drive shaft 54 is a continuous shaft that has cog pulleys or drive wheels 56A and 56B thereon, positioned on opposite sides on the frame 46. The cog pulleys or drive wheels drive separate endless, positive drive clogged belts 58A and 58B that are mounted over the idler pulleys 48 at the inner end of the frame. The endless belts are then driven by the cog pulleys or wheels 56A and 56B when the shaft 54 is driven through a drive gear 60, and a gear set 62 from a controlled stepper motor 64 that is also controlled by the controller 18.

The gear 60 is durably mounted onto the shaft 54, but the cog pulleys 56A and 56B are rotatably mounted on the shaft and are driven through friction drive slip clutch assemblies 64A and 64B on opposite sides of the frame 46, so that the pulley 56A is independently driven by the slip clutch 64A and the pulley 56B is independently driven by the slip clutch 64B in a known manner. The slip clutches frictionally engage the shaft 54. A collar 65 is held on the shaft 54 with a set screw and can be used to axially position the shaft and slip clutches.

The slidably disc support tray panel 66 forming part of the tray assembly 30 is a top panel that receives the disc to be processed and which panel is supported on and spaced above plate 35. The plate 35 has the side edge portions forming guides 36 that ride along the rails 34. The tray assembly 30 is slidably guided for movement from a retracted position shown in FIG. 3 to an extended position shown in FIGS. 2 and 5. In order to drive the tray assembly 30, a rear portion 68 of the tray panel 66, has a pair of arms 70A and 70B fixed thereon. The arms 70A and 70B extend outwardly over the rails 34 and are secured to the flexible belts 58A and 58B with suitable clamps 72A and 72B, respectively. Thus, when the motor 64 is driven under control of controller 18, and the belts 58A and 58B are driven, the tray 66 will be moved along the rails 34 by movement of the belts 58A and 58B that in turn pull on the arms 70A and 70B and slide the tray assembly in and out.

Figure 5:
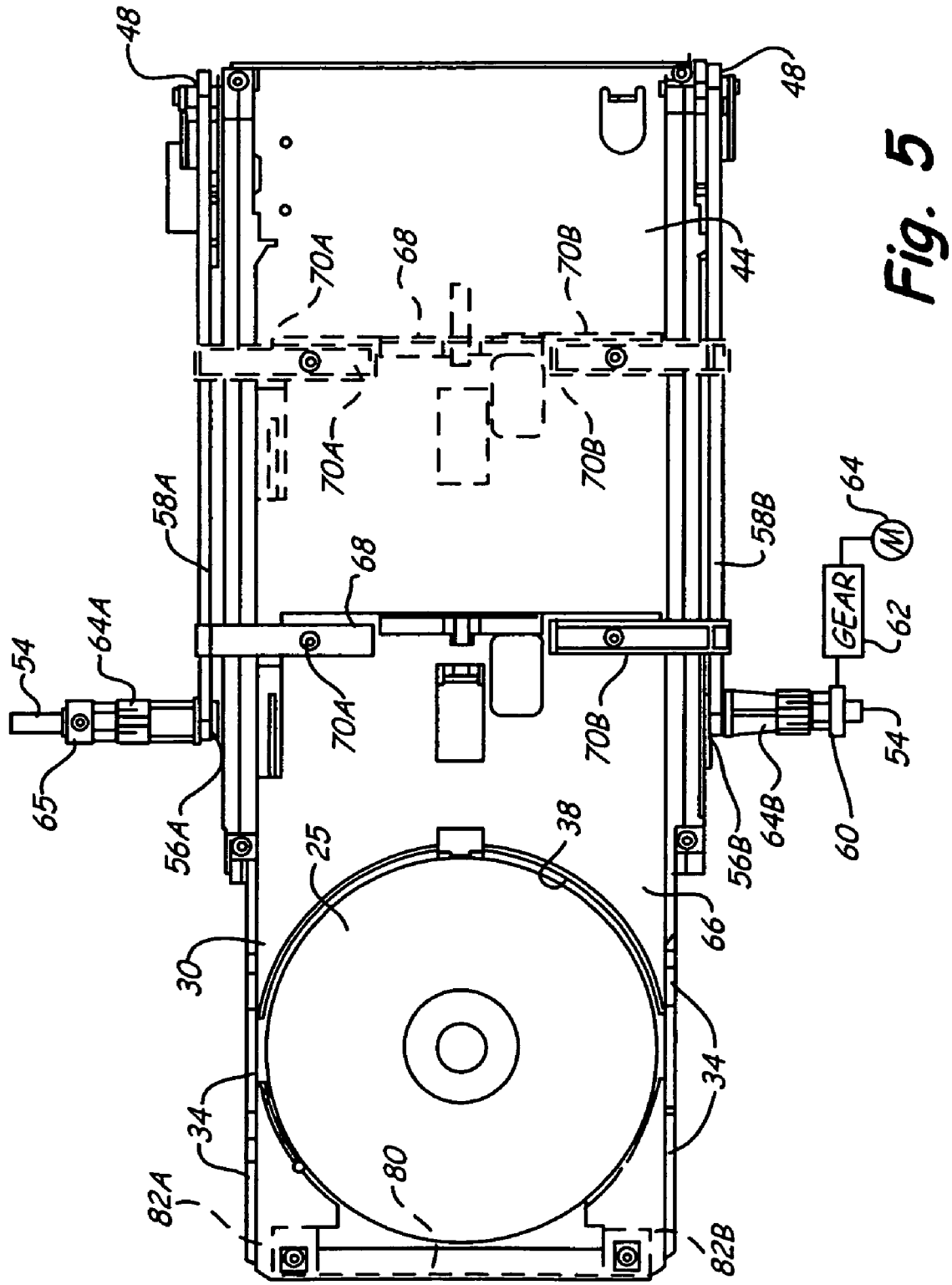
FIG. 5 is a top plan view of the tray assembly showing the tray assembly in dotted lines in a partially extended portion and in noted lines in its extended loading position.

When the tray assembly is extended as shown in FIG. 5, it can be seen that the longitudinal overlap between the side edge portion guides 36 and the rails 34 is at a minimum, and the outer end of the tray assembly can tend to move laterally of its normal direction of movement or skew. The tendency to skew is greatly limited by the use of two drive belts as shown to provide symmetrical forces moving the tray assembly.

Figure 6:
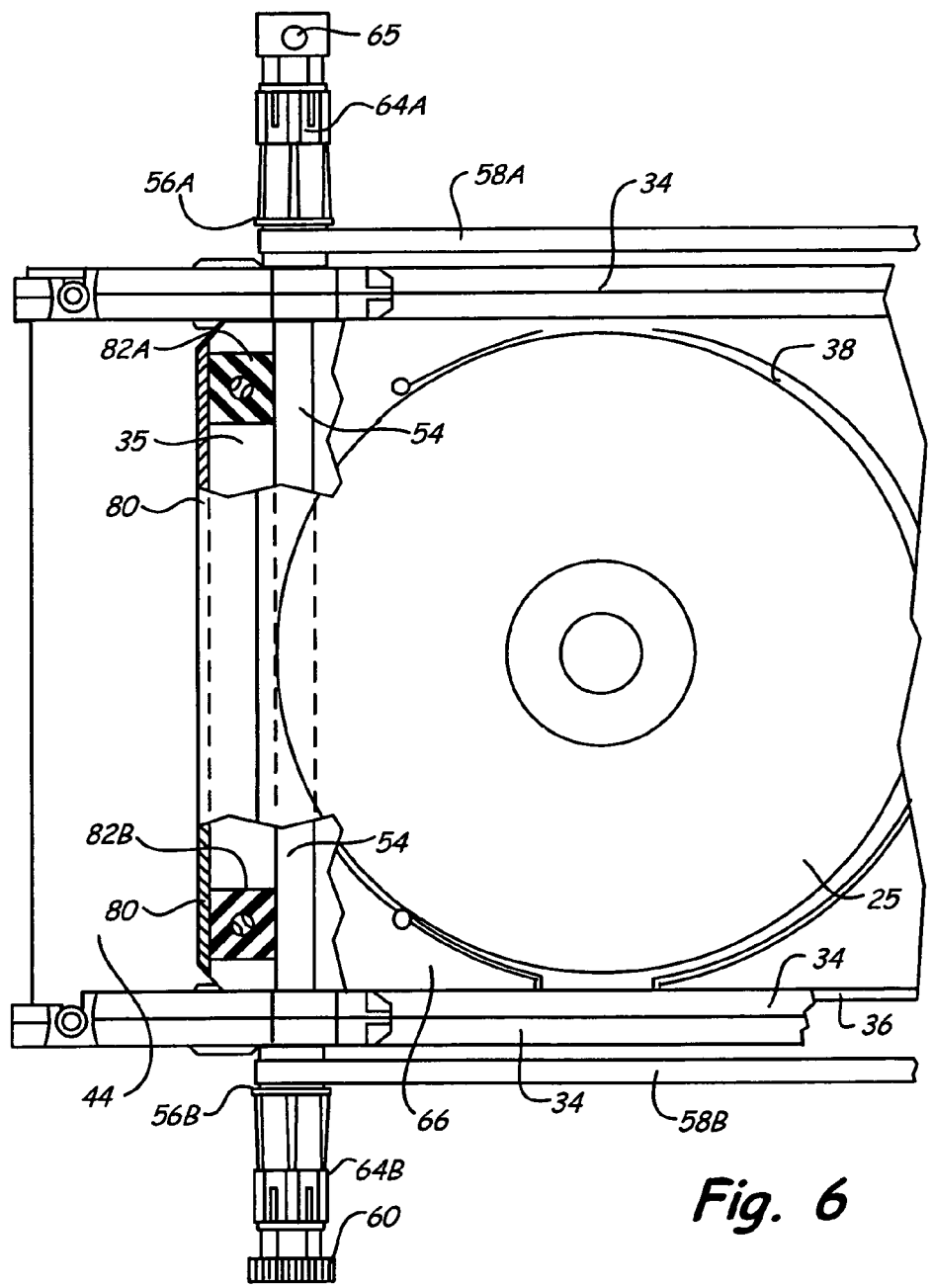
FIG. 6 is an enlarged fragmentary top plan view of the tray in a retracted position and with parts broken away.

In order to ensure that the retracted position of the tray assembly is at a centered, referenced, and square position, the tray assembly front wall indicated fragmentarily at 80 in FIG. 3, and also in FIG. 6, is provided with precisely positioned stop blocks or bumpers 82A and 82B made out of a suitable material such as a rubber or elastomeric material that will absorb some shock load and yet will provide for a positive stop. These blocks 82A and 82B are aligned with the shaft 54 that spans the frame 46 and are between the side member 47.

When the tray assembly is retracted, if for example a leading edge of the tray indicated at 84 is skewed slightly as exaggerated by the dotted lines 84A in FIG. 3, the drive through the slip clutch 64A will cause the reference or stop block or bumper 82A to contact the shaft 54 prior to the time that the reference block or bumper contacts the shaft 54. Since the shaft 54 is driven by the gear 60 through a slip clutch, the controller will provide for a longer time of driving than is necessary to merely seat the tray assembly, so that the pulley 56B will continue to be drive through the slip clutch 64B, and the slip clutch 64A will slip so that the belt 58A will not move farther, but the belt 58B will continue to be driven in the direction as indicated by the arrow 86. This then will ensure that the side of the tray assembly that is being drive by clamp 72B on the belt 58B and the arm 70B will be moved to its home or reference position as shown in FIG. 3 with both blocks 82A and 82B resting on the shaft 54. The shaft 54 is held in its longitudinal position so it is a fixed stop in longitudinal direction. Stopping the motor 64 at a suitable time will stop the rotation of the shaft 54, but if the blocks or bumpers 82A and 82B are against the shaft 54 there is no problem, if the shaft continues to rotate. The blocks or bumpers can be suitably hard to provide a positive reference stop against the longitudinally fixed shaft. Other stops fixed to the frame of the processor can be used, but the shaft 54 already is on the interior of the tray assembly, between the bottom plate 35 and the disc support tray panel 66 and is easily used.

Thus, by driving both sides of the tray assembly 30 through separate drives that are each controlled by slip clutches the drive is balanced on the tray to reduce skewing. The reference stop members adjacent the sides of the tray assembly will engage a reference position of fixed stop members, such as the shaft 54, or even a fixed stop supported by the fame 46. Permitting the drives on opposite sides of the tray assembly to be driven by friction that will permit one side to seat on the stop while the other side continues to drive 20, the orientation of the tray assembly in its retracted position can be zeroed or referenced each time the tray assembly retracts.

The slip clutches can be of any desired design, and provide a drive between the shaft 54 and the cog pulleys or drive wheels 56A and 56B.

Although the present invention has been described with reference to preferred embodiments, workers skilled in the art will recognize that changes may be made in form and detail without departing from the spirit and scope of the invention.

What is claimed is:

1. A processor for processing a compact disc, said processor having a processing station, and a compact disc loading station, a tray for carrying a compact disc between a processing position in the processing station and a loading position in the loading station, said processor having guide rails supporting opposite sides of the tray, the tray extending outwardly from the guide rails when in its loading position, and drive members to move each of the opposite sides of the tray to drive the tray along the guide rails between the loading and processing positions, a separate slip clutch for frictionally driving each of the drive members on the opposite sides of the tray to permit one of the drive members to drive while the other drive member is slipping, and a stop mounted on the tray having laterally spaced first stops, each of which engages a second fixed stop at two spaced locations, the drive members continuing to drive through the slip clutches until both first stops engage the second fixed stop when the tray is moved to its processing position.

2. The processor of claim 1 wherein the fixed stop comprises a cross shaft mounted on the support frame for the tray, and the cross shaft driving both of the drive members on opposite sides of the tray.

3. The drive of claim 1 wherein the drive members on opposite sides of the tray assembly comprise separate endless belts mounted on pulleys to extend between a first and a second end of the support frame, a coupling arm portion on the tray assembly durably connected to the separate endless belts, respectively.

4. The drive of claim 3 and a common drive shaft driving both of the drive belts through separate friction slip clutches.

5. The processor of claim 1 wherein said spaced blocks comprise separated blocks made of shock absorbing material mounted on a forward end of the tray assembly, and movable to engage the stop as the tray assembly retracts.

6. The processor of claim 5 wherein there is a common drive shaft rotatably mounted on the support frame for driving both of the drive members simultaneously, the common drive shaft comprising the stop.

7. A processor for processing a compact disc, said processor having a processing station, and a compact disc loading station, a tray for carrying a compact disc between a processing position in the processing station and a loading position in the loading station, said processor having guide rails supporting opposite sides of the tray, the tray extending outwardly from the guide rails when in its loading position, a motor, and drive members driven by the motor and drivably coupled to each of the opposite sides of the tray to move each of the opposite sides of the tray to drive the tray along the guide rails between the loading and processing positions, and a separate friction clutch between the motor and each respective drive member, whereby each drive member can stop independent of the other drive member as the motor continues to drive.

8. The processor of claim 7 wherein there are a pair of blocks carried by the tray adjacent opposite sides thereof, stop portions mounted to be non-movable in longitudinal direction of the rails and aligned with the blocks and engaging the blocks as the tray is moved to its loading position, and wherein the drive on opposite sides of the tray comprise slip clutches to separate frictionally drive each of the drives whereby one drive will drive a side of the tray while the other drive is slipping.

9. The processor of claim 8 wherein the tray has a top disc support panel including a support for a compact disc.

10. The processor of claim 7 wherein said drives comprise endless belts mounted on said frame and extending in longitudinal direction, and coupling members for coupling opposite sides of the tray to the respective belt, and the belts being simultaneously driven for moving the tray between the loading and processing positions.

11. The processor of claim 10 wherein said separate drive comprises separate drive pulleys for driving the respective belts and the drive pulleys being mounted on a common shaft, and separate slip clutches between the shaft and each of the separate drive pulleys.

12. The processor of claim 11 wherein one end of said tray has a pair of spaced, shock absorbing blocks mounted thereon, said blocks being positioned to engage the common shaft to stop movement on the tray when the tray is moved to its processing position.

13. The processor of claim 7 wherein the processor comprises a printer to print on the compact disc when said disc is on the tray and the tray is in its processing position.

14. A processor for processing a compact disc, including a processing station and a disc loading station, a tray movable linearly along guide rails between a retracted processing position in the processing station, and an extended loading position in the disc loading station, a drive for moving the tray in opposite directions along the rails between the processing station and the disc loading station, said drive comprising a separate drive belt mounted on each side of the tray, a common shaft extending across the tray and rotatably mounted on the processor, said common shaft carrying a pair of drive pulleys, one pulley positioned on each side of the tray for driving belts, respectively, a friction drive between each one of the pair of pulleys and the common shaft, said friction drive limiting the amount of force with which the drive belts are driven, a drive motor to drive said common shaft, and separate connectors between each of the belts and the tray to move the tray along the guides when the belts are driven.

15. The processor of claim 14, and cooperating stops between the tray and the processor to stop the tray when it reaches its retracted processing position.

16. The processor of claim 15, wherein said cooperating stops comprise elastomeric bumpers on the tray, and the common shaft being positioned to be engaged by the bumpers when the tray is in its retracted processing position.

* * * * *